United States Patent
Hirato

(10) Patent No.: US 8,446,539 B2
(45) Date of Patent: May 21, 2013

(54) DISPLAY PANEL AND DISPLAY APPARATUS

(75) Inventor: Shinichi Hirato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 961 days.

(21) Appl. No.: 12/522,489

(22) PCT Filed: Nov. 26, 2007

(86) PCT No.: PCT/JP2007/072759
§ 371 (c)(1),
(2), (4) Date: Jul. 8, 2009

(87) PCT Pub. No.: WO2008/111268
PCT Pub. Date: Sep. 18, 2008

(65) Prior Publication Data
US 2009/0322715 A1    Dec. 31, 2009

(30) Foreign Application Priority Data
Mar. 13, 2007 (JP) .................................. 2007-064015

(51) Int. Cl.
*G02F 1/1333* (2006.01)
(52) U.S. Cl.
USPC .................. 349/54; 349/38; 349/39; 349/55
(58) Field of Classification Search
None
See application file for complete search history.

(56) References Cited

U.S. PATENT DOCUMENTS

| | | | |
|---|---|---|---|
| 5,831,708 A | 11/1998 | Hiraishi et al. | |
| 5,943,106 A | 8/1999 | Sukenori et al. | |
| 6,175,393 B1 | 1/2001 | Ban et al. | |
| 6,191,832 B1 | 2/2001 | Nakakura | |
| 6,462,792 B1 | 10/2002 | Ban et al. | |
| 7,471,349 B2 * | 12/2008 | Komeno et al. | 349/39 |
| 2004/0012727 A1 * | 1/2004 | Kim et al. | 349/54 |
| 2005/0122305 A1 | 6/2005 | Murao et al. | |

FOREIGN PATENT DOCUMENTS

| | | |
|---|---|---|
| JP | 60-35776 | 2/1985 |
| JP | 61-145584 | 7/1986 |
| JP | 61-175622 | 8/1986 |
| JP | 6-230422 | 8/1994 |
| JP | 11-119250 | 4/1999 |

OTHER PUBLICATIONS

International Search Report for PCT/JP2007/072759, mailed Dec. 18, 2007.

* cited by examiner

*Primary Examiner* — Richard Kim
(74) *Attorney, Agent, or Firm* — Nixon & Vanderhye P.C.

(57) ABSTRACT

Each of spare lines (EL1 through ELn) is provided, for a corresponding one of source lines (SL1 through SLn), at one end of a pixel (PIX) on the side facing a source line SL of the pixel (PIX). A source line (SLi) and a spare line (ELi) are connected via a connection line (61). This makes it possible to realize a display panel in which a data signal line and a corresponding spare line are unlikely to have a breaking that causes their electrical connections not to be kept up to their ends, in an arrangement in which spare lines are provided for respective data signal lines.

2 Claims, 12 Drawing Sheets

DISPLAY PANEL AND DISPLAY APPARATUS

This application is the U.S. national phase of International Application No. PCT/JP2007/072759 filed 26 Nov. 2007, which designated the U.S. and claims priority to Japan Application No. 2007-064015 filed 13 Mar. 2007, the entire contents of each of which are hereby incorporated by reference.

TECHNICAL FIELD

The present invention relates to an arrangement in which a display apparatus can be driven by use of a spare line in a case where a wiring failure occurs in a display apparatus.

BACKGROUND ART

Some active matrix liquid crystal display apparatuses have spare lines for respective data signal lines so as not to have a pixel to which a data signal cannot be supplied in a case where a breaking of a data signal line occurs in a manufacturing process. In the present Description, each of pixels is referred to an arrangement corresponding to one of colors such as RGB, and can be also referred to as picture element.

FIG. 8 illustrates a part of an arrangement of a liquid crystal display panel, having such spare lines, disclosed in Patent Literature 1.

As illustrated in FIG. 8, a plurality of scanning signal lines 6 intersect with a plurality of data signal lines 5. A region surrounded by two adjacent scanning signal lines 6 and two adjacent data signal lines 5 forms one pixel region. Each of pixels includes a TFT 8 that electrically connects or disconnects a data signal line 5 with/from a pixel electrode 7. Each of the pixels includes a storage capacitance electrode. The storage capacitance electrode and a storage capacitance line 13 provided in parallel with the scanning signal line 6 form a storage capacitance. A drain electrode of the TFT 8 is connected with a picture electrode 7, via (i) a connection electrode 25 including the storage capacitance electrode and (ii) a contact hole 27. A spare line 15 is provided so as to be adjacent to and parallel with a corresponding data signal line 5. In each pixel, a spare line 15 is connected with a data signal line 5, via a link line 16 (see an arrangement illustrated on the left of FIG. 8, in which the spare line 15 and the corresponding data signal line 5 are connected in a ladder form).

With the spare lines 15, it is possible to supply a data signal, which is supplied to a data signal line 5 from a data signal line driving section, to terminatory pixels even if a part of the data signal line 5 is broken.

Patent Literature 2 also discloses an arrangement in which spare lines are provided in parallel with respective data signal lines, and a data signal line and a spare line are connected with each other in each pixel.

CITATION LIST

Patent Literature 1
Japanese Patent Application Publication, Tokukai, No. 2005-165048 A (Publication Date: Jun. 23, 2005)
Patent Literature 2
Japanese Patent Application Publication, Tokukaihei, No. 9-90318 A (Publication Date: Apr. 4, 1997)
Patent Literature 3
Japanese Patent No. 3376379 (Registration Date: Dec. 6, 2002)

SUMMARY OF THE INVENTION

According to an arrangement, such as those disclosed in Patent Literatures 1 and 2, in which (i) spare lines are provided for respective data signal lines and (ii) a data signal line and a spare line, in each pair, are connected with each other, a spare line is provided close to a corresponding data signal line. This causes a problem that, when a breaking occurs on a data signal line, another breaking is likely to occur concurrently on a spare line so that the two breakings occur at respective points close to each other.

As illustrated in FIG. 8, according to Patent literatures 1 and 2, a spare line is provided so as to be away from a data signal line by only a half distance of a pixel pitch in a direction in which scanning signal lines extend. A typical pixel has a size such as 100 μm×300 μm or 200 μm×600 μm. Therefore, a typical pixel pitch is in a range from approximately 100 μm to approximately 200 μm. In a clean room in which liquid crystal apparatuses are manufactured, dust is newly generated during a manufacturing process although air dust is controlled so as to be extremely small in size and in amount. Such dust is small in number. Note, however, that dust which is relatively large in size is likely to be generated by a manufacturing apparatus and/or a process material.

In a case where, during a photolithography process in which patterning is carried out with respect to data signal lines, (i) there is a foreign object adhered to a substrate due to insufficient washing in a washing step or (ii) there is contamination of a foreign object due to dust generated in a resist coater, then the foreign object is most likely to have a size so as to pass over a data signal line and a spare line. In a case where this causes a defect of an etching mask for the data signal line and the spare line, as illustrated in FIG. 9, a data signal line 5 and a spare line 15 are broken in areas X and Y which are substantially closest to each other. This is because the etching is carried out even with respect to an area that should be remained in the etching process.

In a case where a data signal line and a spare line are concurrently broken in areas which are substantially closest to each other, a data signal cannot be supplied to end sides of the respective lines beyond the broken areas. The inability to supply a data signal must be avoided since it is a fatal defect in the substrate on the whole.

The present invention was made in view of the problem. An object of the present invention is to realize a display panel and a display apparatus in both of which a data signal line and a corresponding spare line are unlikely to have a breaking that causes their electrical connections not to be kept up to their ends, in an arrangement in which spare lines are provided for respective data signal lines.

In order to attain the object, a display panel of the present invention is an active matrix display panel, including spare lines provided for respective data signal lines, the spare lines each connected with a corresponding one of the data signal lines via a plurality of connection lines, each of the spare lines being away from a corresponding one of the data signal lines, in a direction in which scanning signal lines extend, so that a whole aperture region of a pixel connected with the corresponding one of the data signal lines is sandwiched between the each of the spare lines and the corresponding one of the data signal lines.

According to the invention, a spare line is away from a corresponding data signal line by substantially one pixel pitch, which is a long distance, in a direction in which the scanning signal lines extend, so that a whole aperture region of a pixel is sandwiched between the spare line and the corresponding data signal line. Therefore, it is unlikely that a foreign object generated in a process that caused a breaking of a data signal line concurrently passes over a corresponding spare line. Therefore, the spare line has a low probability of being concurrently broken at a position which is substantially closest to a broken point of the data signal line.

This makes it possible to realize a display panel in which a data signal line and a corresponding spare line are unlikely to have a breaking that causes their electrical connections not to be kept up to their ends, in an arrangement in which spare lines are provided for respective data signal lines.

Each of the spare lines is provided on an end of a pixel connected with a corresponding data signal line which side faces the corresponding data signal line. This makes it possible to reduce in the pixel an amount of light blocked by the spare line. As a result, this makes it possible to reduce a decrease in aperture ratio of the pixel due to provision of the spare lines.

In order to attain the object, the display panel of the present invention is arranged such that the plurality of connection lines are provided so that at least one connection line is provided for every pixel.

According to the invention, at least one connection line is provided for every pixel. This makes it possible to normally supply data signals to all the pixels against most of possible breakings. As a result, this makes it possible to improve manufacturing yield.

In order to attain the object, the display panel of the present invention further includes data signal line driving circuitry provided so as to be connected only with one ends of the respective data signal lines.

The invention allows a data signal line and a corresponding spare line to become less likely to have a breaking that causes their electrical connections not to be kept up to their ends, in a display panel having a simple arrangement in which data signal line driving circuitry is connected only with one ends of respective data signal lines.

In order to attain the object, the display panel of the present invention further includes data signal line driving circuitry being provided so as to be connected with one ends of the respective data signal lines, and with the other ends of the respective data signal lines.

According to the invention, the data signal line driving circuitry is connected with one ends of the respective data signal lines, and with the other ends of the respective data signal lines. Therefore, even if a data signal line and a corresponding spare line are concurrently broken at positions which are substantially closest to each other and thereby two parts which are electrically disconnected from each other arise, the invention makes it possible to normally supply a data signal to each of the two parts.

In order to attain the object, the display panel of the present invention is arranged such that storage capacitance lines for causing pixels to have respective storage capacitances are provided, for respective lines of the pixels, so as to (i) be away from a corresponding one of the plurality of scanning signal lines in a direction in which the data signal lines extend and (ii) extend in a direction intersecting with a direction in which the data signal lines and the plurality of spare lines extend; there are first columns of pixels, among a plurality of columns of pixels, each having a pixel column line which is connected with the respective storage capacitance lines at intersections of the pixel column line and the storage capacitance lines, the pixel column line being at least one of a corresponding one of the data signal lines and a corresponding one of the plurality of spare lines; in each of the first columns of pixels, in a case where the storage capacitance lines connected with the pixel column line at the intersections are first storage capacitance lines, a first storage capacitance line is connected with a spare line of a second column of pixels which is different from the first columns of pixels, at intersections between the first storage capacitance line and the spare line of the second column of pixels, so as to be connected across first storage capacitance lines via the spare line; a first segment that includes all connecting points between the pixel column line and the spare line of the second column of pixels is separated from the first storage capacitance line; a second segment is separated from the spare line of the second column of pixels so that the second segment is separated from a data signal line of the second column of pixels, the second segment including connecting points between the first storage capacitance lines and the spare line of the second column of pixels.

According to the invention, even if a data signal line and a corresponding spare line are concurrently broken at a pair of positions which are substantially closest to each other, or at a plurality of pairs of positions, the invention makes it possible to electrically connect a plurality of parts which are electrically disconnected from each other, by use of the first segment of the first storage capacitance line and the second segment of the spare line in the second column of pixels. Therefore, it is possible to normally supply a data signal to a data signal line even if the data signal line and a corresponding spare line are concurrently broken at a pair of positions which are substantially closest to each other, or at a plurality of pairs of positions.

In order to attain the object, the display panel of the present invention is arranged such that a voltage is applied via both ends of each of the plurality of storage capacitance lines.

According to the invention, in a case where parts of a line composed of a data signal line and a corresponding spare line which parts are electrically disconnected from each other are connected by use of one segment on a storage capacitance line, an voltage applied to the storage capacitance line is applied to all the rest of the storage capacitance line. As a result, it is possible to cause all storage capacitances connected with the rest of the storage capacitance line to operate normally.

In order to attain the object, the display panel of the present invention is arranged such that, in each pixel, (i) a pixel electrode, and (ii) a data signal line, a spare line, and a connection line are provided so that the pixel electrode does not face, in a film thickness direction, the data signal line, the spare line, and the connection line.

According to the invention, it is possible to reduce a parasitic capacitance between (i) a pixel electrode and (ii) a data signal line, a spare line, and a connection line. In addition, this makes it possible to reduce a probability of a leakage between a pixel electrode and a data signal line, between a pixel electrode and a spare line, and between a pixel electrode and a connection line.

In order to attain the object, the display panel of the present invention is arranged such that, in each pixel, a pixel electrode and a scanning signal line are provided so as not to face each other in a film thickness direction.

According to the invention, it is possible to reduce a probability of leakage between a pixel electrode and a scanning signal line.

In order to attain the object, the display panel of the present invention is arranged such that, in each pixel, a pixel electrode and a selecting element for selecting a pixel are provided so as not to face each other in a film thickness direction.

According to the invention, it is possible to reduce a probability of leakage between a pixel electrode and a selecting element for selecting a pixel.

In order to attain the object, the display panel of the present invention is an active matrix display panel, including spare lines provided for respective scanning signal lines, the spare lines each connected with a corresponding one of the scanning signal lines via a plurality of connection lines, each of the spare lines being away from a corresponding one of the scanning signal lines, in a direction in which the data signal lines extend, so that a whole aperture region of a pixel connected with the corresponding one of the scanning signal lines is sandwiched between the each of the spare lines and the corresponding one of the scanning signal lines.

According to the invention, a spare line is away from a corresponding scanning signal line by substantially one pixel pitch, which is a long distance, in a direction in which the data signal lines extend, so that a whole aperture region of a pixel is sandwiched between the spare line and the corresponding scanning signal line. Therefore, it is unlikely that a foreign object generated in a process that caused a breaking of a scanning signal line concurrently passes over a corresponding spare line. Therefore, the spare line has a low probability of being concurrently broken at a position which is substantially closest to a broken point of the scanning signal line.

This makes it possible to realize a display panel in which a scanning signal line and a corresponding spare line are unlikely to have a breaking that causes their electrical connections not to be kept up to their ends, in an arrangement in which spare lines are provided for respective scanning signal lines.

Each of the spare lines is provided on an end of a pixel connected with a corresponding scanning signal line which side faces the corresponding scanning signal line. This makes it possible to reduce in the pixel an amount of light blocked by the spare line. As a result, this makes it possible to reduce a decrease in aperture ratio of the pixel due to provision of the spare lines.

In order to attain the object, the display panel of the present invention is arranged such that the plurality of connection lines are provided so that at least one connection line is provided for every pixel.

According to the invention, at least one connection line is provided for every pixel. This makes it possible to normally supply scanning signals to all the pixels against most of possible breakings. As a result, this makes it possible to improve manufacturing yield.

In order to attain the object, the display panel of the present invention further includes scanning signal line driving circuitry provided so as to be connected only with one ends of the respective scanning signal lines.

The invention allows a scanning signal line and a corresponding spare line to become less likely to have a breaking that causes their electrical connections not to be kept up to their ends, in a display panel having a simple arrangement in which scanning signal line driving circuitry is connected only with one ends of respective scanning signal lines.

In order to attain the object, the display panel of the present invention further includes scanning signal line driving circuitry being provided so as to be connected with one ends of the respective scanning signal lines, and with the other ends of the respective scanning signal lines.

According to the invention, the scanning signal line driving circuitry is connected with one ends of the respective scanning signal lines, and with the other ends of the respective scanning signal lines. Therefore, even if a scanning signal line and a corresponding spare line are concurrently broken at positions which are substantially closest to each other and thereby two parts which are electrically disconnected from each other arise, the invention makes it possible to normally supply a scanning signal to each of the two parts.

In order to attain the object, the display panel of the present invention is arranged such that, in each pixel, (i) a pixel electrode, and (ii) a scanning signal line, a spare line, and a connection line are provided so that the pixel electrode does not face, in a film thickness direction, the scanning signal line, the spare line, and the connection line.

According to the invention, it is possible to reduce a parasitic capacitance between (i) a pixel electrode and (ii) a scanning signal line, a spare line, and a connection line. In addition, this makes it possible to reduce a probability of a leakage between a pixel electrode and a scanning signal line, between a pixel electrode and a spare line, and between a pixel electrode and a connection line.

In order to attain the object, the display panel of the present invention is arranged such that, in each pixel, a pixel electrode and a data signal line are provided so as not to face each other in a film thickness direction.

According to the invention, it is possible to reduce a probability of leakage between a pixel electrode and a data signal line.

In order to attain the object, the display panel of the present invention is arranged such that, in each pixel, a pixel electrode and a selecting element for selecting a pixel are provided so as not to face each other in a film thickness direction.

According to the invention, it is possible to reduce a probability of leakage in a pixel between a pixel electrode and a selecting element for selecting a pixel.

In order to attain the object, the display panel of the present invention is an active matrix display panel, including: first spare lines provided for respective data signal lines, the first spare lines each connected with a corresponding one of the data signal lines via a plurality of first connection lines; second spare lines provided for respective scanning signal lines, the second spare lines each connected with a corresponding one of the scanning signal lines via a plurality of second connection lines, each of the first spare lines being away from a corresponding one of the data signal lines, in a direction in which scanning signal lines extend, so that a whole aperture region of a pixel connected with the corresponding one of the data signal lines is sandwiched between the each of the first spare lines and the corresponding one of the data signal lines, each of the second spare lines being away from a corresponding one of the scanning signal lines, in a direction in which the data signal lines extend, so that a whole aperture region of a pixel connected with the corresponding one of the scanning signal lines is sandwiched between the each of the second spare lines and the corresponding one of the scanning signal lines.

According to the invention, it is possible to realize a display panel in which a pair of a data signal line and a corresponding first spare line, and a pair of a scanning signal line and a corresponding second spare line are unlikely to have a breaking that causes their electrical connections not to be kept up to their ends, in an arrangement in which the first spare lines are provided for respective data signal lines and the second spare lines are provided for respective scanning signal lines.

In addition, this makes it possible to reduce a decrease in aperture ratio of the pixel due to provision of the spare lines.

In order to attain the object, a display apparatus of the present invention includes any one of the display panels.

According to the invention, it is possible to manufacture, with a high yield, a display apparatus having a display panel without illumination failure of a pixel.

Additional objects, features, and strengths of the present invention will be made clear by the description below. Further, the advantages of the present invention will be evident from the following explanation in reference to the drawings.

EXPLANATION OF REFERENCE LETTERS AND NUMERALS 41, 71, 81, and 91 Display panel
45 Gate driver (scanning signal line driving circuitry)
46 and 72 Source driver (data signal line driving circuitry)
61 and 92 Connection line
SL1 through SLn Source line (data signal line)
GL1 through GLm Gate line (scanning signal line)
EL1 through ELn Spare line
FL1 through FLm Spare line
CSL Storage capacitance line
PIX Pixel

DESCRIPTION OF EMBODIMENTS

First Embodiment

The following describes one embodiment of the present invention, with reference to FIGS. 1 through 4.

Figure 1:
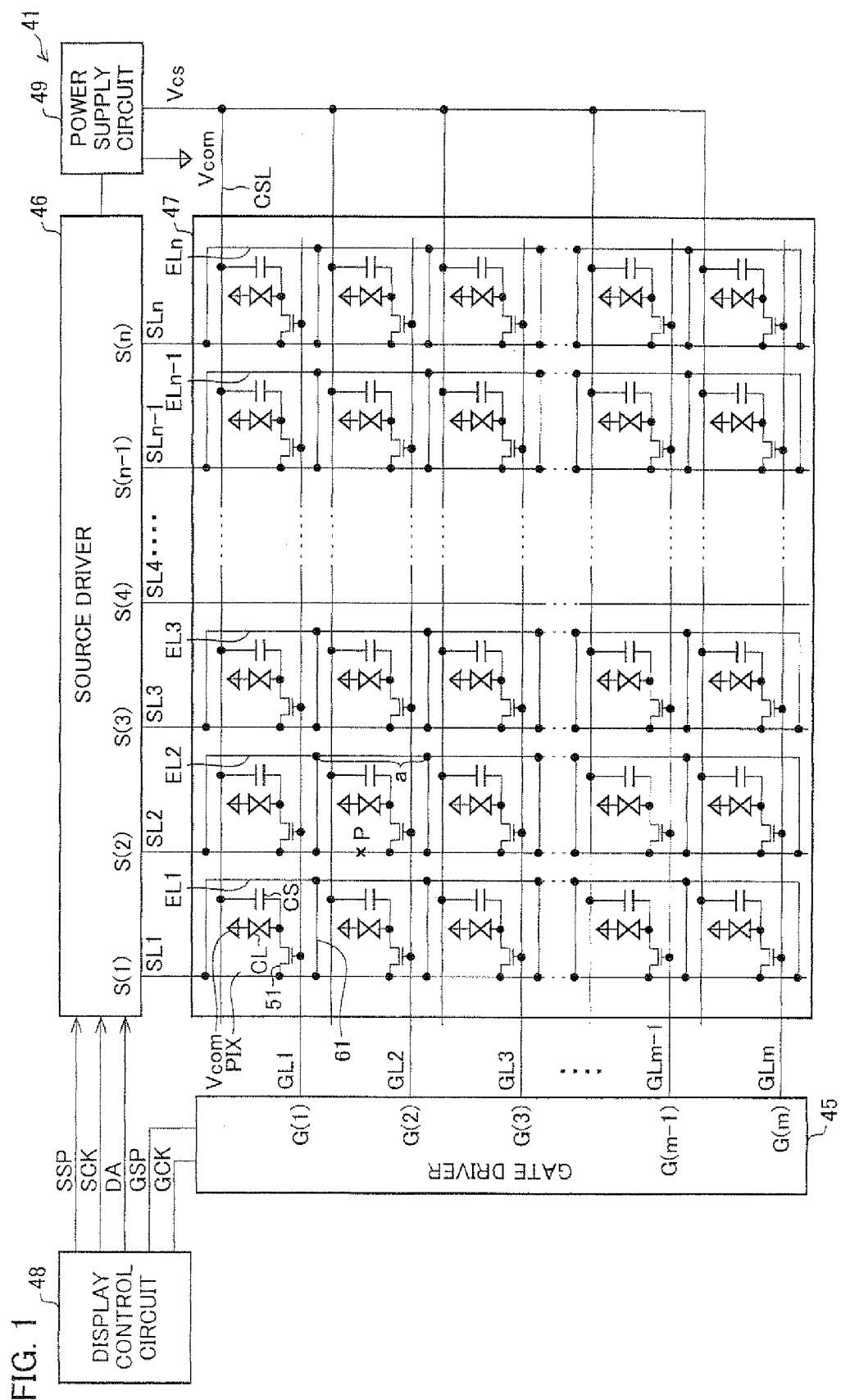
FIG. 1 is a circuit block diagram illustrating an arrangement of a display panel of a first embodiment of the present invention.

FIG. 1 illustrates an arrangement of a display panel 41 of a liquid crystal display apparatus (display apparatus) in accordance with the present embodiment.

The display panel 41 is an active matrix display apparatus including: a gate driver 45 which serves as scanning signal line driving circuitry; a source driver 46 which serves as data signal line driving circuitry; a display section 47; a display control circuit 48 for controlling the gate driver 45 and the source driver 46; and a power supply circuit 49.

The display section 47 includes: gate lines GL1 through GLm which serve as a plurality of scanning signal lines (m scanning signal lines); source lines SL1 through SLn, serving as a plurality of data signal lines (n data signal lines), which intersect with the gate lines GL1 through GLm; and a plurality of pixels PIX (m×n pixels PIX) provided at each intersection of the gate lines GL1 through GLm and the source lines SL1 through SLn. The display section 47 includes storage capacitance lines CSL provided in parallel with the respective gate lines GL1 through GLm. One storage capacitance line CSL is allocated to each line of pixels composed of n pixels PIX provided in a direction parallel with the gate lines GL1 through GLm.

The display section 47 includes spare lines EL1 through ELn in parallel with the source lines SL1 through SLn. Spare line ELi is allocated to an i-th ($1 \leq i \leq n$) column of pixels composed of m pixels PIX provided in a direction parallel with the source lines SL1 through SLn. The spare line ELi is provided, at one end of a pixel PIX on the side where the spare line ELi faces a source line SLi in a direction in which a gate line GLj extends, so that a whole aperture region (i.e., light transmissive region) of the pixel PIX connected with the source line SLi is sandwiched between the spare line ELi and the source line SLi. The spare line ELi is connected with the source line SLi via connection lines 61. The connection lines 61 are provided in parallel with the gate lines GL1 through GLm. In each pixel, the connection line 61 is provided in a region except a region extending from a corresponding gate line GL to a corresponding storage capacitance line CSL. Also, connection lines 61 are provided on a source line SL end side in relation to a gate line GLm which is a gate line most distant from the source driver 46.

The pixels PIX are provided in a matrix manner to form a pixel array. Each of the pixels PIX includes a TFT 51, a liquid crystal capacitance CL, and a storage capacitance CS. A gate terminal of a TFT 51 is connected with a gate line GLj; a source terminal of a TFT 51 is connected with a source line SLi; a drain terminal of a TFT 51 is connected with a pixel electrode. A liquid crystal capacitance CL includes a pixel electrode, a common electrode, and a liquid crystal layer sandwiched between the pixel electrode and the common electrode. A voltage Vcom is applied to the common electrode by a power supply circuit 49. The storage capacitance CS includes a storage capacitance electrode connected with a pixel electrode, a storage capacitance line CSL, and an insulating film sandwiched between the storage capacitance electrode and the storage capacitance line CSL. A voltage Vcs that is applied by the power supply circuit 49 to a storage capacitance line CSL can be equal to the voltage Vcom.

The display control circuit 48 receives signals such as a digital video signal indicative of an image to be displayed, a horizontal sync signal, and a vertical sync signal from an external signal source, and generates, in accordance with the signals thus received, signals such as a gate start pulse signal (GSP), a gate clock signal (GCK), a source start pulse signal (SSP), a source clock signal (SCK), and a digital video signal DA so as to output the signals thus generated.

The gate driver 45 generates, in response to a gate start pulse signal GSP and a gate clock signal GCK both supplied from the display control circuit 48, scanning signals G(1) through G(m) for sequentially scanning the gate lines GL1 through GLm, every horizontal period.

The source driver 46 generates, in response to a source start pulse signal SSP, a source clock signal SCK, and a digital video signal DA, data signals S(1) through S(n) to be outputted by a line-sequential manner to the source lines SL1 through SLn, respectively, every horizontal period. One end of each of the source lines SL1 through SLn is connected with only the source driver 46 as source driver. The source driver 46 is exemplified by a digital driver that carries out a D/A conversion with respect to a digital video signal so as to supply an analog signal thus converted in the line-sequential manner to the source lines SL1 through SLn. However, the present embodiment is not limited to the digital driver. That is, the source driver 46 can be any driver such as an analog driver that samples an analog video signal so as to supply the analog video signal thus sampled in a point-sequential manner to the source lines SL1 through SLn.

In response to sequential scanning of the gate lines GL1 through GLm by the gate driver 45, a data signal S(i) is written into a corresponding one of pixels PIX of a line that has been scanned, via a corresponding source line SLi and a TFT 51. The data signal S(i) is also written into the corresponding one of the pixels PIX, via a spare line ELi connected with the source line SLi. A voltage difference between a voltage of the data signal S(i) thus supplied and the voltage Vcom of the common electrode is applied to a liquid crystal capacitance CL of the corresponding one of the pixels PIX. This causes the corresponding one of the pixels PIX to carry out a display with a luminance which varies according to the voltage thus applied.

Assume that a source line SL2 is broken at a point P. The point P is located between (i) a point connecting the source line SL2 and a TFT 51 of a pixel PIX connected with a gate line GL1 and the source line SL2 and (ii) a point connecting the source line SL2 and a TFT 51 of a pixel PIX connected with a gate line GL2 and the source line SL2. If a spare line EL2 is not provided, the data signal S(2) supplied from the source driver 46 to the source line SL2 will not be supplied to an end side of the source line SL2 beyond the point P. Since the spare line EL2 is provided in the present embodiment, it is possible to supply the data signal S(2) from the spare line EL2 to the end side of the source line SL2 beyond the point P, via connection lines 61 connecting the source line SL2 with the spare line EL2 on the end side of the source line SL2 beyond the point P.

The spare line EL2 is away from the source line SL2 by a distance corresponding to substantially one pixel pitch in a direction in which a gate line GLj extends, so that a whole aperture region of a pixel PIX is sandwiched between the spare line EL2 and the source line SL2. Therefore, a foreign object generated in a process that caused the breaking at the point P on the source line SL2 is not very likely to concurrently pass over the spare line EL2. Therefore, the spare line EL2 has a low probability of being broken, while the source line SL2 is being broken, on a segment "a" on the spare line EL2 between two adjacent connection lines 61 between which the point P is sandwiched.

A spare line EL1 is adjacent to the source line SL2. Even if the spare line EL1 is broken concurrently with the breaking at the point P on the source line SL2, the source line SL1 has a low probability of being concurrently broken. Therefore, it is at low risk that supply failure of a data signal in one of two adjacent columns of pixels concurrently causes another supply failure of a data signal in the other one of the two adjacent columns of pixels. The connection lines 61 are provided more than one. Therefore, it is low in probability that no supply route via which the data signal is supplied can be secured due to concurrent breakings of all of the connection lines 61.

FIG. 1 illustrates that the spare lines ELi and connection lines 61 are provided only within the display section 47. However, the present embodiment is not limited to this. Alternatively, the spare lines ELi and connection lines 61 can be freely provided for the respective source lines SLi in an area such as an area between the source driver 46 and the display section 47. It is possible to normally supply data signals to all the pixels PIX against most of possible breakings, by providing at least one connection line 61 for every pixel PIX as is illustrated in FIG. 1. This improves manufacturing yield.

Figure 2:
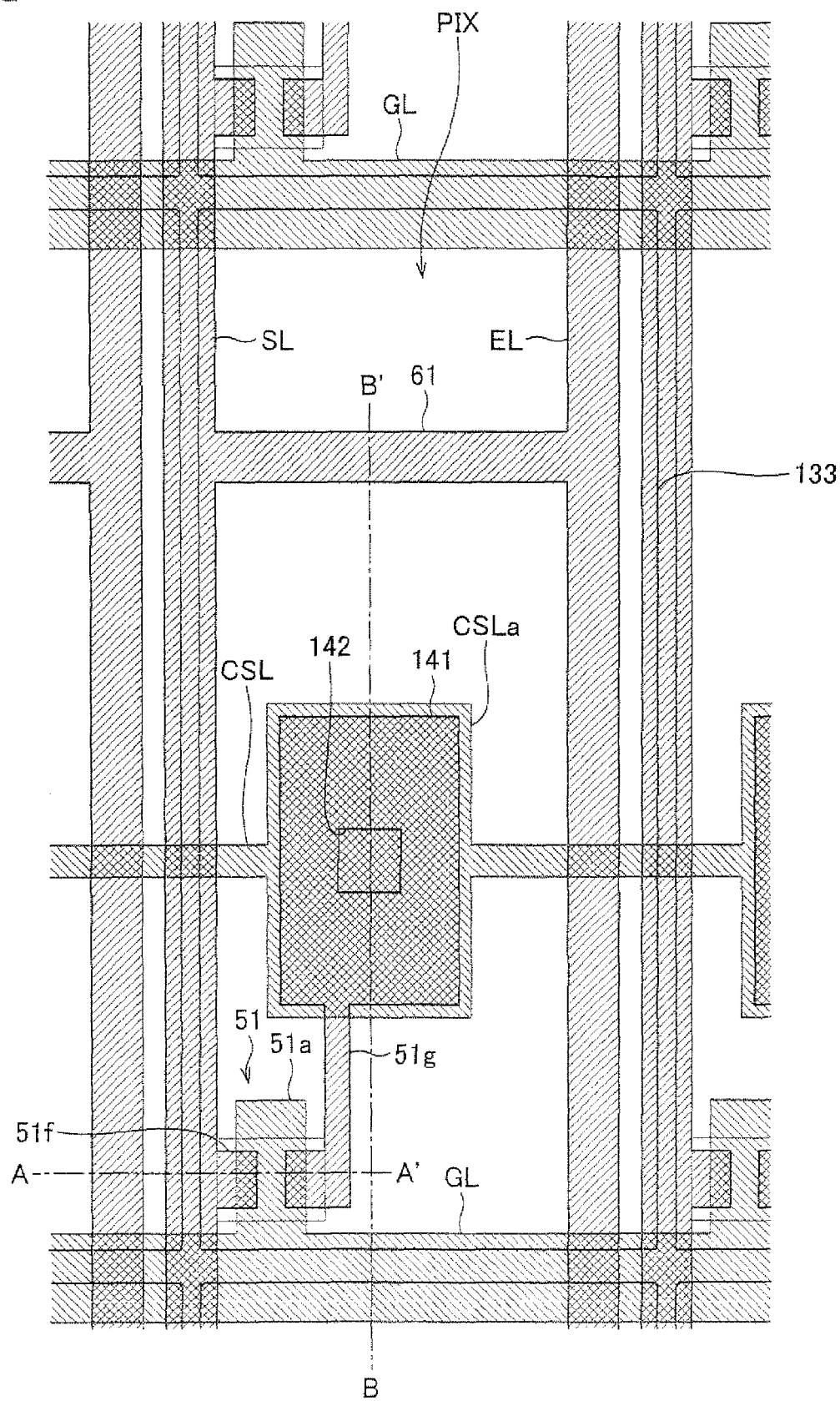
FIG. 2 is a plan view illustrating an arrangement of a pixel of the display panel of FIG. 1.

FIG. 2 illustrates a plan view of a part corresponding to one pixel of an array substrate 102.

The array substrate 102 includes thereon the gate lines GL1 through GLm, the source lines SL1 through SLn, the spare lines EL1 through ELn, the connection lines 61, the storage capacitance lines CSL, TFTs 51, picture electrodes 133, and storage capacitance counter electrodes 141.

Figure 3:
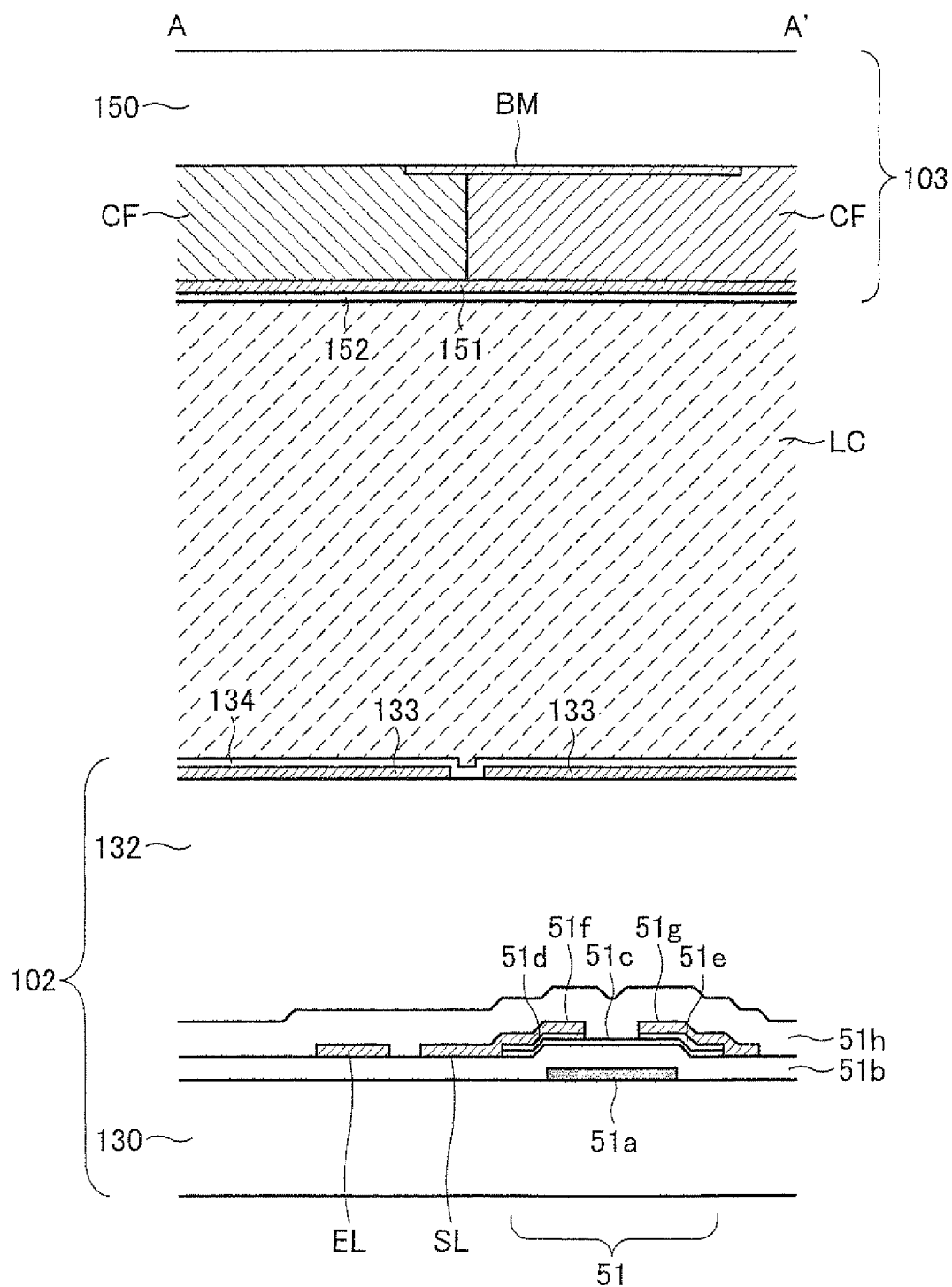
FIG. 3 is a cross-sectional view of the pixel of FIG. 2 which cross-sectional view was taken along the line A-A'.

FIG. 3 shows a cross-sectional view taken along the line A-A' of FIG. 2 along which a region including a TFT 51, a source line SL, and a spare line EL is cut in a channel length direction.

The array substrate 102 illustrated in FIG. 3 is arranged such that a TFT 51, an interlayer insulating film 132 made of a material such as polyimide or acrylic resin, a picture electrode 133 which is a transparent electrode such as ITO, and an alignment film 134 made of a material such as polyimide are formed on a glass substrate 130 in this order. A TFT 51 is arranged such that a gate electrode 51$a$ made of an Al/Ti laminated film and Cr, an insulating film 51$b$ made of silicon nitride or silicon oxide, a semiconductor layer 51$c$ made of amorphous silicon, a contact layer 51$d$ made of n$^+$ silicon that forms a source region, a contact layer 51$e$ made of n$^+$ silicon that forms a drain region, a source electrode 51$f$ and a drain electrode 51$g$ both of which are made of an Al/Ti laminated film, and a protection film 51$h$ made of silicon nitride are stacked on the glass substrate 130 in this order. The gate electrode 51$a$ is made of the same material as that of the gate lines GL. The gate electrode 51$a$ is part of a pattern of a gate line GL. The source electrode 51$f$ and the drain electrode 51$g$, and a spare line EL are made of the same material as that of the source lines SL, and are concurrently formed. The source electrode 51$f$ is part of a pattern of a source line SL. The drain electrode 51$g$ is connected with a storage capacitance counter electrode 141 (to be described later). The source line SL and the spare line EL are formed on the insulating film 51$b$.

A counter substrate 103 illustrated in FIG. 3 adopts a well known arrangement. The counter substrate 103 is arranged such that a black matrix MB, color filters CF, a common electrode 151, and an alignment film 152 are formed on a glass substrate 150 in this order. The array substrate 102 and the counter substrate 103 are provided so that the alignment film 134 and the alignment film 152 face each other. A liquid crystal layer LC is provided between the alignment film 134 and the alignment film 152.

Figure 4:
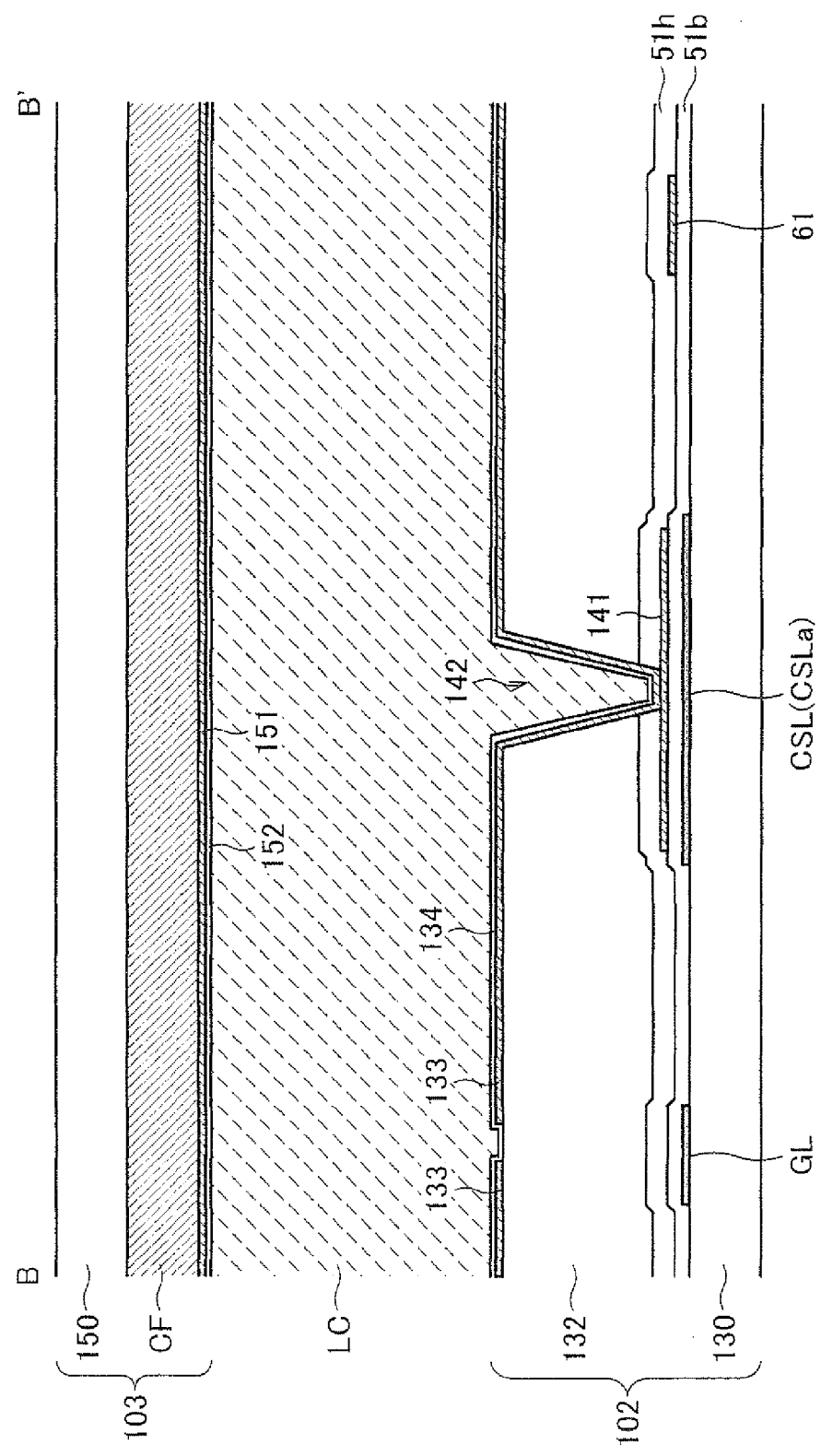
FIG. 4 is a cross-sectional view of the pixel of FIG. 2 which cross-sectional view was taken along the line B-B'.

FIG. 4 illustrates a cross-sectional view taken along the line B-B' along which a region of FIG. 2 including the gate line GL, the storage capacitance counter electrode 141, and the connection line 61 is cut in a direction parallel with the source line SL.

The array substrate 102 illustrated in FIG. 4 is arranged such that a gate line GL and a storage capacitance line CSL, an insulating film 51$b$, a storage capacitance counter electrode 141, a protection film 51$h$, an interlayer insulating film 132, pixel electrodes 133, and an alignment film 134 are provided on the glass substrate 130 in this order. The insulating film 51$b$ and the protection film 51$h$ are the same as those of a TFT 51. The storage capacitance line CSL is made of the same material as that of the gate line GL. The storage capacitance line CSL connects, in the direction in which the gate line GL extends, two-dimensional extensions CSLa formed for respective pixels PIX. The storage capacitance counter electrode 141 is made of the same material as that of the drain electrode 51$g$. The storage capacitance counter electrode 141 is provided so as to face a corresponding extension CSLa. A contact hole 142 that reaches the storage capacitance counter electrode 141 is formed in the interlayer insulating film 132. The pixel electrode 133 and the alignment film 134 are formed in this order on the interlayer insulating film 132 and on an inner wall of and on a bottom surface of the contact hole 142. With the arrangement, the drain electrode 51$g$ of the TFT 51 is electrically connected with the pixel electrode 133 and the storage capacitance counter electrode 141. A connection line 61 is formed, on the insulating film 51b, of the same material as those of the source line SL and the spare line EL. The connection line 61, the source line SL, and the spare line EL are concurrently formed.

Respective arrangements of the counter substrate 103 and the liquid crystal layer LC of FIG. 4 are the same as those of FIG. 3.

The above is an arrangement of each of the pixels PIX.

In the present embodiment, a storage capacitance CS is formed by a storage capacitance line CSL and a storage capacitance counter electrode 141. However, a storage capacitance CS can be formed by a storage capacitance counter electrode 141 and an adjacent gate line GL which is closer to a starting end of the source line SL. In this case, for example, a part from the pixel electrode side of a drain electrode 51g in the TFT 51 to a storage capacitance counter electrode 141 is formed so as to get across a connection line 61 via the insulating film, after a source line SL, a spare line EL, the connection line 61, a source electrode 51f and a drain electrode 51g are formed. In this case, the connection line 61 can be provided in any position except an area above the TFT 51. Note that it is alternatively possible to arrange so that no storage capacitance CS is provided.

In the present embodiment, a spare line ELi is provided on an edge of a pixel PIX. Therefore, in a pixel PIX having a length longer than a width, the spare line ELi extending in a longitudinal direction hardly contributes to an increase in blocking amount of transmitted light. In contrast, according to a conventional arrangement illustrated in FIG. 8, the spare line 15 extends in the center of the pixel which is longer in length than a width. Therefore, the spare line 15 greatly blocks the transmitted light. As such, according to the arrangement of the present embodiment, the provision of the spare lines ELi causes a small decrease in aperture ratio of a pixel.

Figure 8:
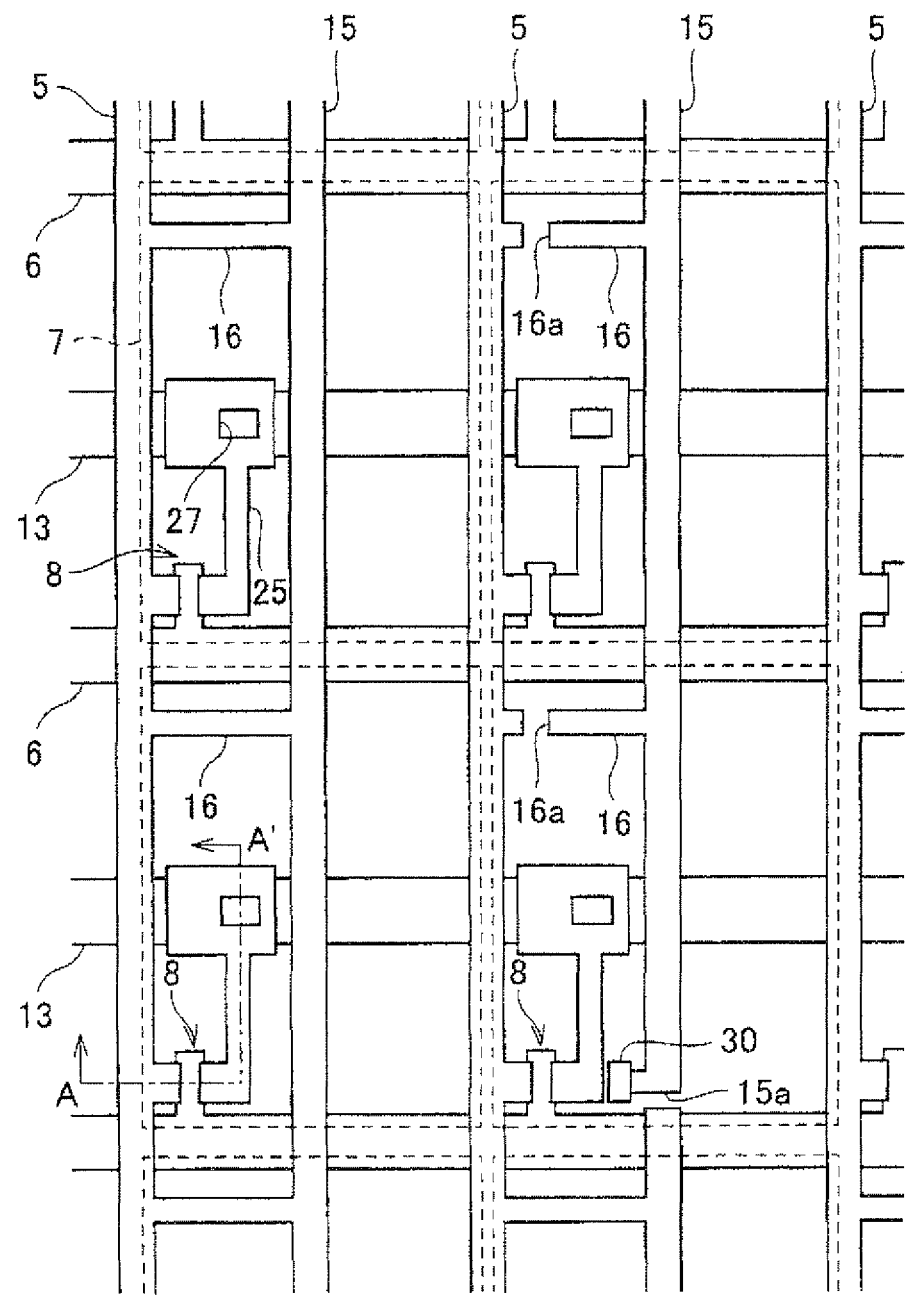
FIG. 8 is a plan view illustrating an arrangement of pixels of a display panel according to a conventional art.
Figure 9:
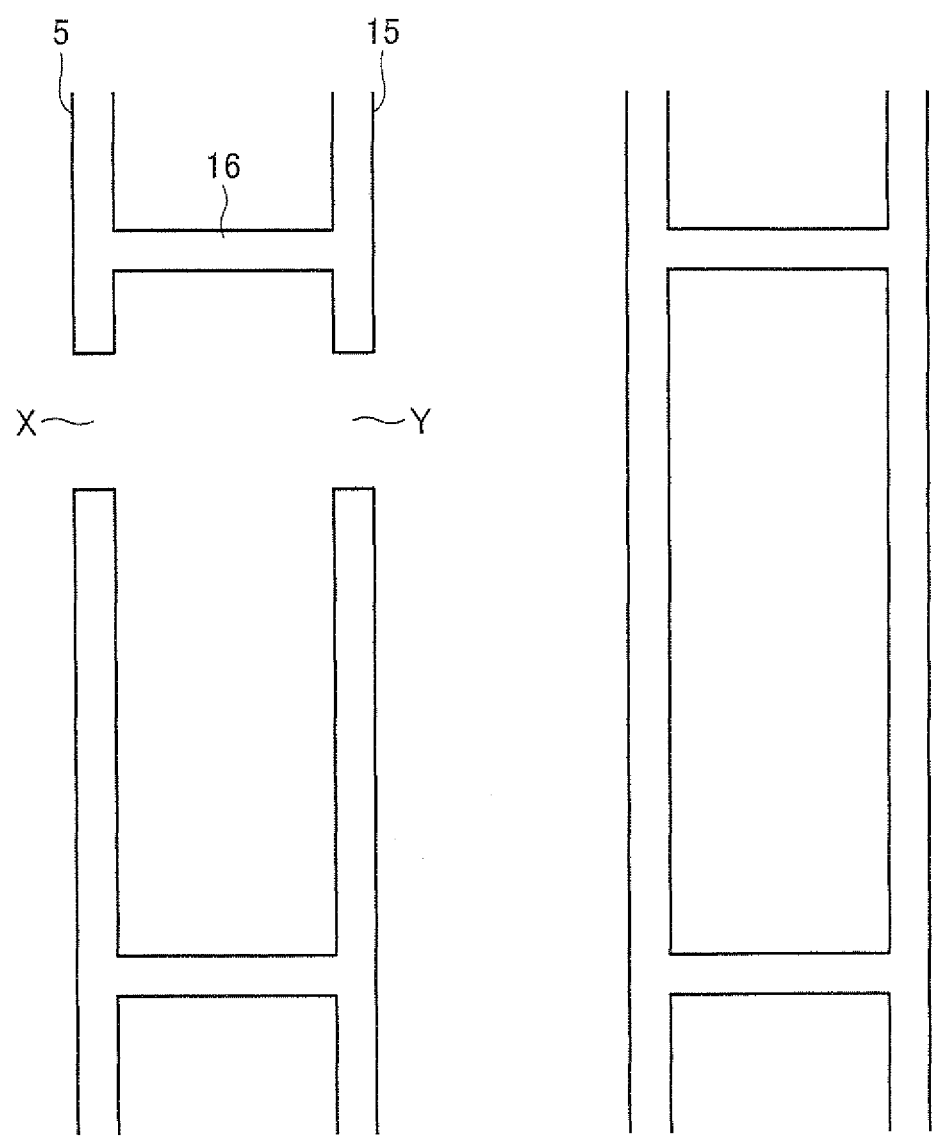
FIG. 9 is a plan view illustrating a state of breakings of a data signal line and a spare line of a conventional display panel.

According to the conventional arrangement illustrated in FIG. 8, the spare line 15 extending in the center of the pixel which is longer in length than a width. This causes a problem that light leakage easily occurs due to a taper of an edge of the spare line 15 and/or a film thickness of the spare line 15. The present embodiment solves such a problem.

According to the present embodiment, furthermore, lines for supplying data signals are provided on both sides of a pixel PIX. This halves an effect of light leakage from a back side of the glass substrate 130 to a liquid crystal layer LC side, as compared with a case where only a single source line SL is provided as a line for supplying a data signal. A black matrix EM sufficiently blocks light, provided that, as is illustrated in FIG. 3, it blocks light above a source line SL. Therefore, there is no need to further extend a black matrix BM above a spare line EL.

According to the present embodiment, further, a spare line EL in one of adjacent columns of pixels is in close to a source line SL in the other one of the adjacent columns of pixels. However, even if a leakage occurs between the spare line EL and the source line SL, a leakage point can be separated by use of a method such as laser fusion. This allows normal supply of a data signal via remaining supply routes.

Note that each of the connection lines 61 can be provided at an edge on the side of a pixel PIX which edge faces a corresponding gate line GLj. The provision of the connection line 61 at the edge of the pixel PIX eliminates blocking of light due to the connection line 61. This reduces a decrease in aperture ratio of a pixel caused by provision of the spare line ELi.

Second Embodiment

Figure 5:
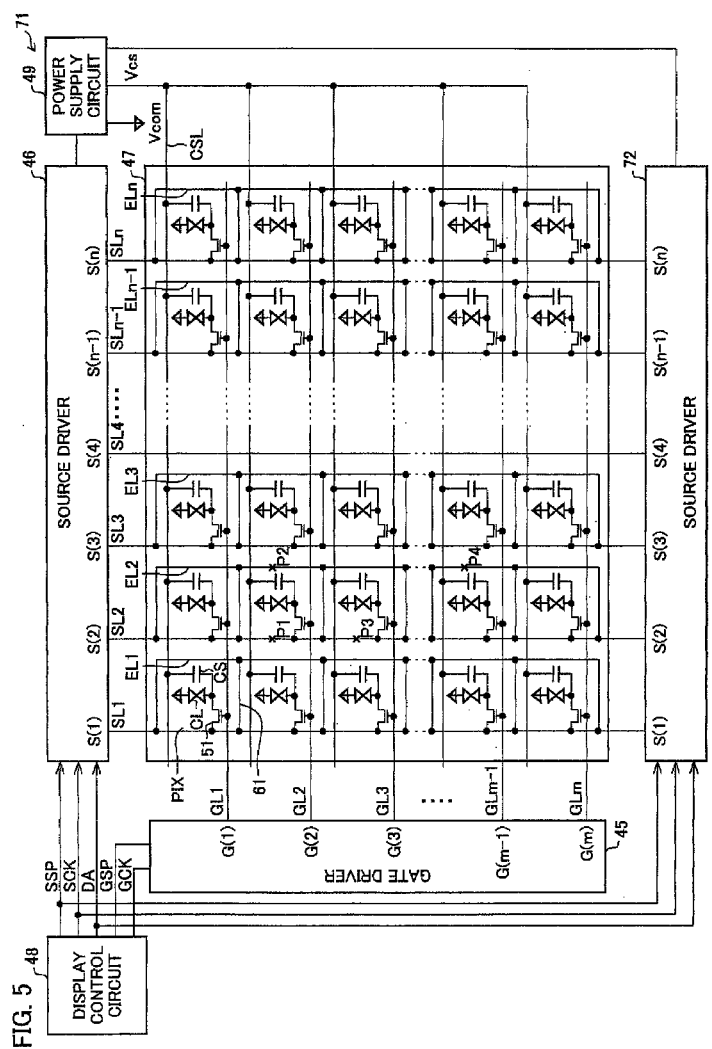
FIG. 5 is a circuit block diagram illustrating an arrangement of a display panel of a second embodiment of the present invention.

The following describes another embodiment of the present invention, with reference to FIG. 5. The following omits descriptions of members having the same reference letters and numerals as those of the members described in the first embodiment since they have the same functions.

FIG. 5 illustrates an arrangement of a display panel 71 of a liquid crystal display apparatus (display apparatus) in accordance with the present embodiment.

The display panel 71 is arranged such that a source driver (data signal line driving circuitry) 72 is added to the display panel 41 of FIG. 1. The source driver 72 has the same internal arrangement as that of a source driver 46. The source driver 72 is provided so that a display section 47 is sandwiched between the source drivers 46 and 72. The source driver 72 is connected with source lines SL1 through SLn so that end sides of the source lines SL1 through SLn connected to the source driver 46 are start sides of the source lines SL1 through SLn connected to the source driver 72, respectively. Both the source drivers 46 and 47 receive, in common, a source start pulse signal SSP, a source clock signal SCK, and a digital video signal DA from a display control circuit 48. Consequently, the source driver 72 supplies, to the source lines SL1 through SLn, the same data signals S(1) through S(n) as those supplied by the source driver 46.

Even if a source line SLi and a corresponding spare line ELi are concurrently broken so that a whole of the source line SLi, the spare line ELi, and connection lines 61 is divided into two parts (i.e., a part on a source driver 46 side and a part on a source driver 72 side) which are electrically disconnected from each other, it is possible that the source drivers 46 and 72 supply data signal S(i) to the respective two parts.

For example, assume that a breaking occurs at a point P1 on a source line SL2 and a breaking occurs at a point P2 on a spare line EL2, the points P1 and P2 being positioned between (i) a connection line 61 of a pixel PIX connected with a gate line GL2 and with a source line SL2 and (ii) a connection line 61 of a pixel PIX connected with a gate line GL3 and with the source line SL2. This causes the part on the source driver 46 side in relation to the points P1 and P2 and the part on the source driver 72 side in relation to the points P1 and P2 to become electrically disconnected from each other. Nevertheless, it is possible that the source drivers 46 and 72 supply data signals S(2) to the part on the source driver 46 side and to the part on the source driver 72 side, respectively. In this case, it is easily understood that the data signal S(2) can be normally supplied even if two connection lines 61 between which the points P1 and P2 are sandwiched are further broken concurrently.

According to the present embodiment, a spare line ELi is provided with respect to a source line SLi so that it is difficult for the source line SLi and the spare line ELi to be broken concurrently. Therefore, there is an extremely small probability that further concurrent breakings occur at positions except a pair of positions of concurrent breakings, such as the points P1 and P2. Therefore, it is enough to take into consideration a probability that a source line SLi or a spare line ELi is individually broken, except for the pair of positions of concurrent breakings. Even in a case where a breaking occurs separately, still, a probability is low that both a source line SLi and a spare line ELi are concurrently broken in a single section between two adjacent connection lines 61. Therefore, it is easy to secure a supply route for electrical connection via connection lines 61.

For example, assume that two breakings separately occurred on the source driver 72 side in relation to the points P1 and P2, in addition to the concurrent breakings on the points P1 and P2, (i) at a point P3 on the source line SL2 between (I) a connection line 61 of a pixel PIX connected with the gate line GL3 and with the source line SL2 and (II) a connection line 61 of a pixel PIX connected with a gate line GL4 (not illustrated) and with the source line SL2, and (ii) at a point P4 on the spare line EL2 between (a) a connection line 61 of a pixel PIX connected with a gate line GL*m*-1 and with the source line SL2 and (b) a connection line 61 of a pixel PIX connected with a gate line GL*m* and with the source line SL2. Even in this situation, the source line SL2, the spare line EL2, and the connection lines 61 are as a whole electrically connected, in a part which is closer to the source driver 72 than the points P1 and P2.

As described above, the arrangement of the present embodiment can deal with abrupt emergence of a large foreign object and/or localized emergence of foreign objects, in addition to the effect described in the first embodiment.

Third Embodiment

Figure 6:
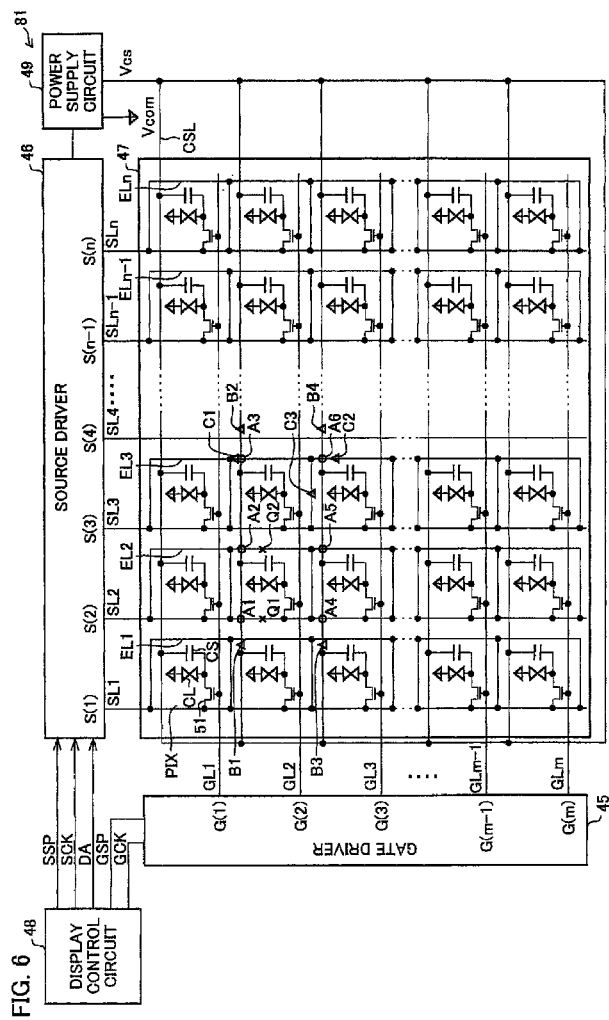
FIG. 6 is a circuit block diagram illustrating an arrangement of a display panel of a third embodiment of the present invention.

The following describes a further embodiment of the present invention, with reference to FIG. 6. The following omits descriptions of members having the same reference letters and numerals as those of the members described in the first embodiment since they have the same functions.

FIG. 6 illustrates an arrangement of a display panel 81 of a liquid crystal display apparatus (display apparatus) in accordance with the present embodiment.

The display panel 81 is arranged such that ends of the storage capacitance lines CSL on the gate driver 45 side of the display panel 41 of FIG. 1 are connected, in an outer area of the display section 47, to an output line via which the power supply circuit 49 supplies the voltage Vcs.

With the arrangement, it is possible to take the measures below against concurrent breakings of a source line SL*i* and a spare line EL*i*.

For example, assume that a breaking occurs on a point Q1 on the source line SL2 and a breaking occurs on a point Q2 on a spare line EL2, the points Q1 and Q2 being positioned between (i) a connection line 61 of a pixel PIX connected with a gate line GL2 and with a source line SL2 and (ii) a connection line 61 of a pixel PIX connected with a gate line GL3 and with the source line SL2. In this situation, (i) a first part which is closer to a source driver 46 than the points P1 and P2 and (ii) a second part opposite to the first part become electrically disconnected from each other. If nothing is done, then it is possible for the source driver 46 to supply a data signal S(2) to the first part while it is not possible for the source driver 46 to supply the data signal S(2) to the second part.

In order to address the inconvenience, the present embodiment intends to use a storage capacitance line CSL so as to send the data signal S(2) from the first part to the second part. In FIG. 2, A1, A2, and A3 are (i) an intersection between a storage capacitance line CSL (first storage capacitance line) allocated to a line of pixels connected with the gate line GL2 and the source line SL2, (ii) an intersection between the storage capacitance line CSL and the spare line EL2 (assume that a column of pixels where i=2 is a first column of pixels, and that a pixel column line is composed of both the source line SL2 and the spare line EL2), and (iii) an intersection between the storage capacitance line CSL and the spare line EL3 (assume that a column of pixels where i=3 is a second column of pixels), respectively. Specifically, the intersections A1, A2, and A3 are irradiated with a laser so that upper and lower lines are connected by welding at the respective intersections A1, A2, and A3. A first segment B1-B2 including the intersections A1, A2, and A3 on the storage capacitance line CSL is fused and separated from the storage capacitance line CSL by irradiating points B1 and B2 at both ends of the first segment B1-B2. Assume that the point B1 is positioned between (i) the point A1 and (ii) a connecting point between (I) a storage capacitance line CSL and (II) a storage capacitance CS of a pixel PIX connected with the gate line GL2 and the source line SL1, and that the point 32 is positioned between (a) the point A3 and (b) a connecting point between (A) the storage capacitance line CSL and (B) a storage capacitance CS (not illustrated) of a pixel PIX connected with the gate line GL2 and a source line SL4.

Intersections A4, A5, and A6 are (i) an intersection between a storage capacitance line CSL (first storage capacitance line) allocated to a row of pixels connected with the gate line GL3 and the source line SL2, (ii) an intersection between the storage capacitance line CSL and the spare line EL2, and (iii) an intersection between the storage capacitance line CSL and the spare line SL3, respectively. The intersections A4, A5, and A6 are irradiated with a laser so that upper and lower lines are connected by welding at the respective intersections A4, A5, and A6. Each of points B3 and B4 at both ends of a first segment B3-B4 including the points A4, A5, and A6 on the storage capacitance line CSL is irradiated with a laser so that the first segment is separated by melting from the storage capacitance line CSL. Assume that the point B3 is positioned between (i) the point A4 and (ii) a connecting point between (I) a storage capacitance line CSL and (II) a storage capacitance CS of a pixel PIX connected with the gate line GL3 and the source line SL1, and that the point B4 is positioned between (a) the point A6 and (b) a connecting point between (A) the storage capacitance line CSL and (B) a storage capacitance CS (not illustrated) of a pixel PIX connected with the gate line GL3 and the source line SL4.

In addition, a second segment B1-B2 including the points A3 and A6 on the source line SL3 is fused and separated from the source line EL3 by irradiating points C1 and C2 at both ends of the second segment B1-B2. Assume that the point C1 is positioned between the point A3 and a connection line 61 immediately adjacent toward a start side of the source line SL3, and that the point C2 is positioned between the point A6 and a connection line 61 immediately adjacent toward an end side of the source line SL3. A point C3 on a connection line 61 connected with the second segment C1-C2 is also separated by fusion. Thus, the segment including the points A3 and A6 on the spare line EL3 is separated from the source line SL3.

As a result, the source line SL2 and the spare line EL2 become electrically connected between the source driver 46 side in relation to the points Q1 and Q2 and the opposite side, by a route of: points A1 and A2→storage capacitance line CSL→point A3→spare line EL3→point A6→storage capacitance line CSL→points A4 and A5. Therefore, it is possible for the source driver 46 to supply the data signal S(2) to the source line SL2 even if concurrent breakings occur at the points Q1 and Q2. Although the second segment C1-C2 of the spare line 61 that pairs off with the source line SL3 is separated by fusion, it is possible for the source driver 46 to normally supply a data signal S(3) to the source line SL3 because a segment on the source line SL3 that pairs off with the second segment C1-C2 is remained.

The first segment B1-B2 and the first segment B3-B4 are separated by fusion from the respective storage capacitance lines CSL. However, every storage capacitance CS connected with a storage capacitance line CSL, except the segments thus separated, effectively functions because the voltage Vcs is applied via both ends of each of the storage capacitance lines CSL. Furthermore, the data signal S(2) is supplied to the storage capacitance line CSL of storage capacitances CS connected with the first segment B1-B2, and to the storage capacitance line CSL of storage capacitances CS connected with the first segment B3-B4. In a case where a voltage applied to storage capacitances CS of pixels PIX connected with the gate lines GL2 and GL3, and with the source line SL3 can cause a defective display of the pixels PIX, (i) selecting a column of pixels where i=1 as a second column of pixels and (ii) separating the second segment from the spare line EL1 allow storage capacitances CS, except those of a column of pixels (where i=2) which caused the concurrent breakings, to always function properly because they are not included in the first segment.

It is possible to select any one or more storage capacitance lines CSL to be subjected to disconnection by fusion, in the first part closer to the source driver 46 than the points Q1 and Q2 and in the second part opposite to the first part. Furthermore, it is possible to shorten a segment separated from the spare line EL3, by selecting a combination of storage capacitance lines CSL, such as two adjacent storage capacitance lines CSL between which the points Q1 and Q2 are located, so that a distance between the two storage capacitance lines CSL is minimized. This makes it possible to separate a segment from the source line EL3 while preventing supply failure of the data signal S(3) to the source line EL3.

The present embodiment deals with the case where the first segment B1-B2 includes both the points A1 and A2 and the first segment B3-B4 includes both the points A4 and A5. However, the present embodiment is not limited to this. Alternatively, the first segment B1-B2 can include only the point A1 or the point A2, and the first segment B3-B4 can include only the point A4 or the point A5 because it is enough to secure an electrical connection between the first part closer to the source driver 46 than the points Q1 and Q2 and the second part opposite to the first part.

It is possible to use any line as a spare line ELi for connecting the first part closer to the source driver 46 than the points Q1 and Q2 and the second part opposite to the first part.

The voltage Vcs does not have to be necessarily applied via both ends of each of the storage capacitance lines CSL. Alternatively, as illustrated in FIG. 1, the voltage Vcs can be applied via only one end of each of the storage capacitance lines CSL.

Furthermore, as long as a point to be fixed does not interfere with other points where electrical disconnections occur, it is possible to electrically connect the parts, which are electrically disconnected from each other, by using storage capacitance lines CSL, even if concurrent breakings on a source line SLi and on a spare line ELi occur at a plurality of pairs of positions on the same pair of lines or on different pairs of lines. Note that a probability of such concurrent breakings is extremely low. That is, even if a source line SLi and a spare line Eli, as a whole, are divided into a plurality of parts which are electrically disconnected from each other, it is possible to electrically connect the plurality of parts with the use of any one or more storage capacitance lines CSL provided to the respective plurality of parts. This is effective particularly in a case where a single source driver is provided and connected with only the one sides of the respective source lines SL1 through SLn. In a case where two source drivers are provided and connected with both ends of the respective source lines SL1 through SLn, it is possible to connect all of a plurality of parts electrically disconnected from each other, into which a source line SLi and a spare line Eli as a whole are divided. Note that, in a case where there are three or more parts which are electrically disconnected from each other, some of the parts are connected with each other with the use of a storage capacitance line CSL so that two parts which are electrically disconnected from each other is ultimately remained. Then, one of the two source drivers supplies a data signal to one of the two parts thus remained, whereas the other one of the two source drivers supplies the data signal to the other one of the two parts.

The present embodiment exemplifies a liquid crystal display apparatus including the points Q1 and Q2 where electrical disconnections occur. However, the present invention is not limited to this. For example, the present invention encompasses a liquid crystal display apparatus which is in a production lot with a high probability of a breaking and is unconditionally subjected to a breaking reparation in accordance with the present embodiment, even if it is unable to detect whether or not a breaking has actually occurred or even if a breaking is not detected, in a case where, for example, it is foreseen or known that a specific number of liquid crystal display apparatuses of such a production lot has breakings. Therefore, as such a display panel, it is possible to exemplify an arrangement such that, there are first columns of pixels, among a plurality of columns of pixels, each having a pixel column line which is connected with respective storage capacitance lines CSL at intersections of the pixel column line and the storage capacitance lines CSL, the pixel column line being at least one of a source line SLi and a spare line ELi; in each of the first columns of pixels, in a case where the storage capacitance lines CSL connected with the pixel column line at the intersections are first storage capacitance lines, a first storage capacitance line is connected with a spare line ELk of a second column of pixels which is different from the first columns of pixels, at intersections between the first storage capacitance line and the spare line ELk of the second column of pixels, so as to be connected across first storage capacitance lines via the spare line ELk; a first segment that includes all connecting points between the pixel column line and the spare line ELk of the second column of pixels is separated from the first storage capacitance line; a second segment is separated from the spare line ELk of the second column of pixels so that the second segment is separated from a source line SLk of the second column of pixels, the second segment including connecting points between the first storage capacitance lines and the spare line ELk of the second column of pixels.

As described above, the arrangement of the present embodiment can deal with abrupt emergence of a large foreign object and/or localized emergence of foreign objects, in addition to the effect described in the first embodiment.

Fourth Embodiment

Figure 7:
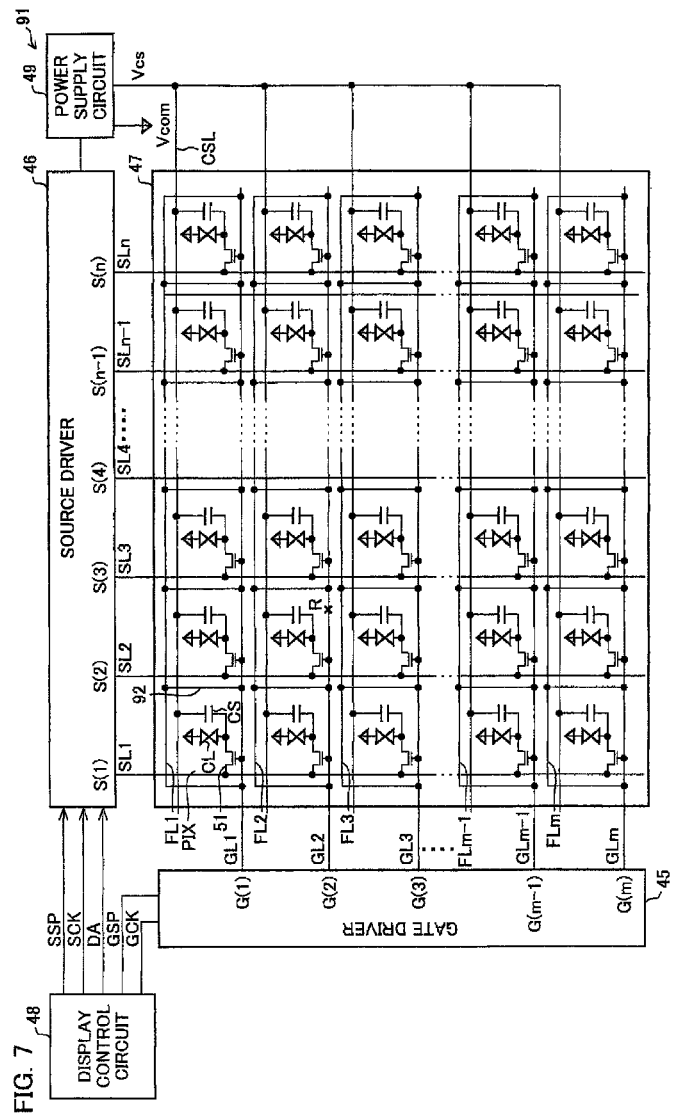
FIG. 7 is a circuit block diagram illustrating an arrangement of a display panel of a fourth embodiment of the present invention.

The following describes still a further embodiment of the present invention, with reference to FIG. 7. The following omits descriptions of members having the same reference letters and numerals as those of the members described in the first embodiment since they have the same functions.

FIG. 7 illustrates an arrangement of a display panel 91 of a liquid crystal display apparatus (display apparatus) in accordance with the present embodiment.

Instead of providing a spare line ELi for a source line SLi in the display panel 41 of FIG. 1, the display panel 91 includes spare lines FL1 through FLm in parallel with gate lines GL1 through GLm. Specifically, a spare line FLj is allocated to a j-th ($1 \leq j \leq m$) line of pixels composed of n pixels PIX provided in the direction parallel with the gate lines GL1 through GLm. A spare line FLj is provided, in an end part on a side of a pixel PIX on which side the spare line FLj faces a gate line GLj in an in-plane direction of the display panel, so that a whole aperture region (i.e., light transmissive region) of the pixel PIX connected with the gate line GLj is sandwiched between the spare line FLj and the gate line GLj. In a display area of a liquid crystal display panel like the one described in the present embodiment, an arrangement, in which a spare line FLj is (i) provided directly under a light-blocking region provided on a counter substrate or (ii) provided so as to overlap or have contact with a region directly under the light-blocking region from the inside of a pixel, is one example of the arrangement in which the entire aperture region is sandwiched between the gate line GLj and the spare line FLj. A spare line FLj is connected with a gate line GLj via a corresponding connection line 92. The connection lines 92 are in parallel with the respective source lines SL1 through GLn. A single connection line 61 is provided, in a region of each pixel PIX except (i) an area on an extension CSLa (see FIG. 2) of a storage capacitance line CSL and (ii) an area on a TFT 51, so as to be closer to a start end of a gate line GL than a source line SL1 which is closest to a gate driver 45.

Accordingly, the spare lines CSL are formed in a process different from a process in which the gate lines GL1 through GLm are formed. An insulating film is provided between the storage capacitance lines CSL and the gate lines GL1 through GLm. Note that the spare lines CSL can be formed before the gate lines GL1 through GLm are formed, and vice versa.

Assume that a gate line GL2 is broken at a point R. The point R is located between (i) a point connecting the gate line GL2 and a gate terminal of a TFT 51 of a pixel PIX connected with the gate line GL2 and with a source line SL2, and (ii) a point connecting the gate line GL2 and a gate terminal of a TFT 51 of a pixel PIX connected with the gate line GL2 and with a source line SL3. If a spare line FL2 were not provided, a scanning signal G(2) supplied from a gate driver 45 to the gate line GL2 would not be supplied to a part on the gate line GL2 closer to an end side of the gate line GL2 than the point R. In the present embodiment, however, the spare line FL2 is provided. Therefore, it is possible to supply the scanning signal G(2) from the spare line FL2 to the part of the gate line GL2 closer to the end side than the point R, via connection lines 92 which connect the gate line GL2 and the spare line FL2 located in the part closer to the end side of the gate line GL2 than the point R.

The spare line FL2 is provided so as to be away from the gate line GL2 by substantially one pixel pitch, which is a long distance, in a direction in which the source line SLi extends. Therefore, a foreign object generated during a process that caused a breaking at the point R on the gate line GL2 is not very likely to concurrently be at a point on the spare line FL2, in a case where the gate line GL2 is electrically disconnected at the point R. Thus, the spare line FL has a low probability of being concurrently broken in a segment on the spare line FL2 between two adjacent connection lines 92 between which the point R is located. A spare line FL3 is adjacent to the gate line GL2 but the gate line GL3 has a low probability of being concurrently broken even if the spare line FL3 is broken concurrently when the gate line GL2 is broken at the point R. Therefore, there is a slight risk of concurrent inability to supply a scanning signal in one of two adjacent lines of pixels while a scanning signal can not be supplied due to a breaking in the other one of the two adjacent lines of pixels. Furthermore, the number of the connection lines 92 is more than one. Therefore, it is low in probability that concurrent breakings of all of the connection lines 92 cause a supply route for electrical connection not to be secured.

FIG. 7 illustrates the spare lines FLi and the connection lines 92 provided only within the display section 47. The present invention, however, is not limited to this. Alternatively, spare lines FLi and connection lines 92 can be provided for respective gate lines GLi in any area such as an area between the gate driver 45 and the display section 47. Providing of the connection lines 92 so that at least one connection line 92 is provided for every pixel PIX as is illustrated in FIG. 7 makes it possible, in most cases, to normally supply a scanning data signal to all pixels PIX of a corresponding line of the pixels PIX even if a breaking occurs. This improves manufacturing yield.

Note in the present embodiment that two gate drivers can be provided on both sides of the display section 47 in conformity with the second embodiment.

Fifth Embodiment

Figure 10:
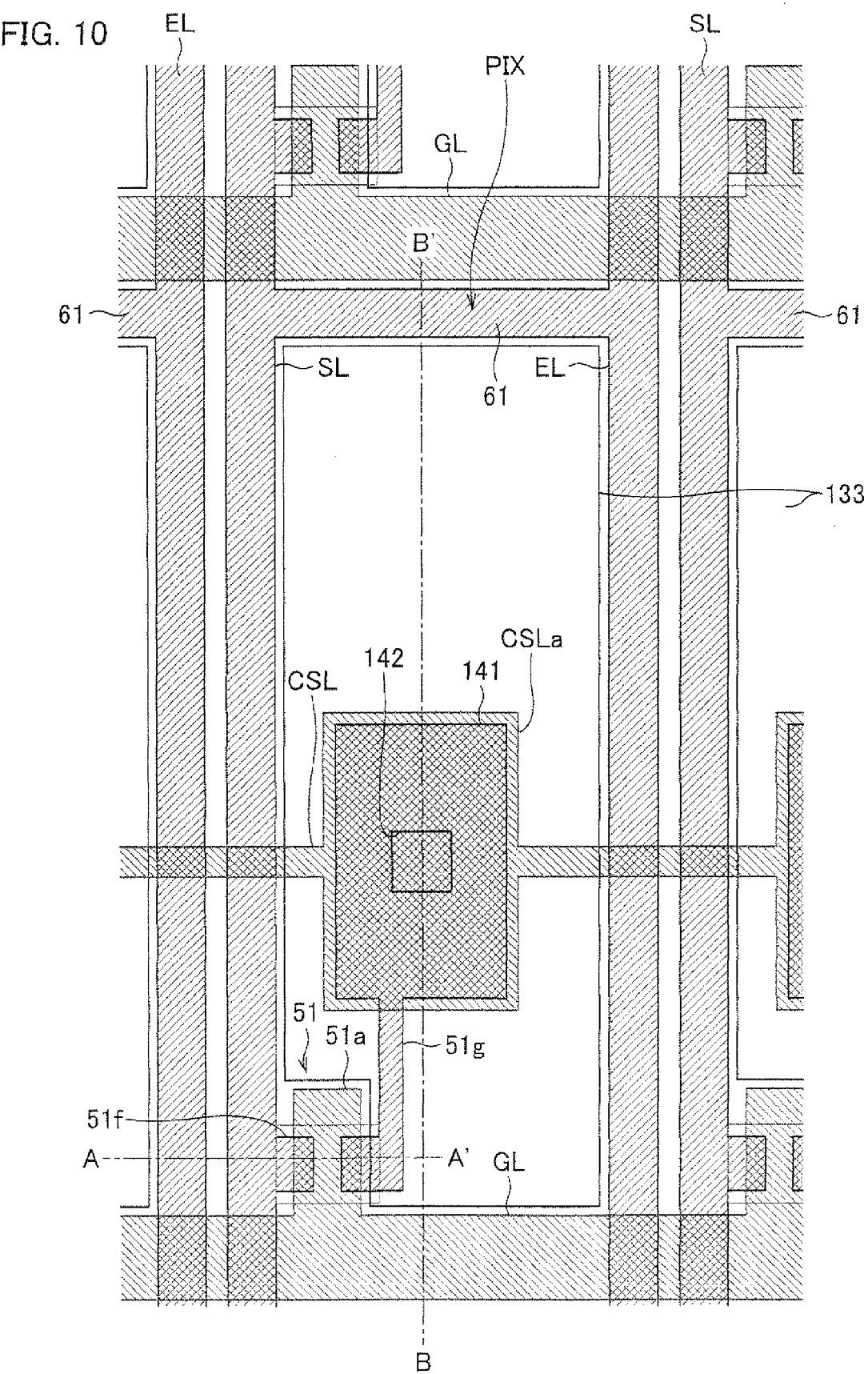
FIG. 10 is a plan view illustrating an arrangement of a pixel of a display panel of a fifth embodiment of the present invention.
Figure 11:
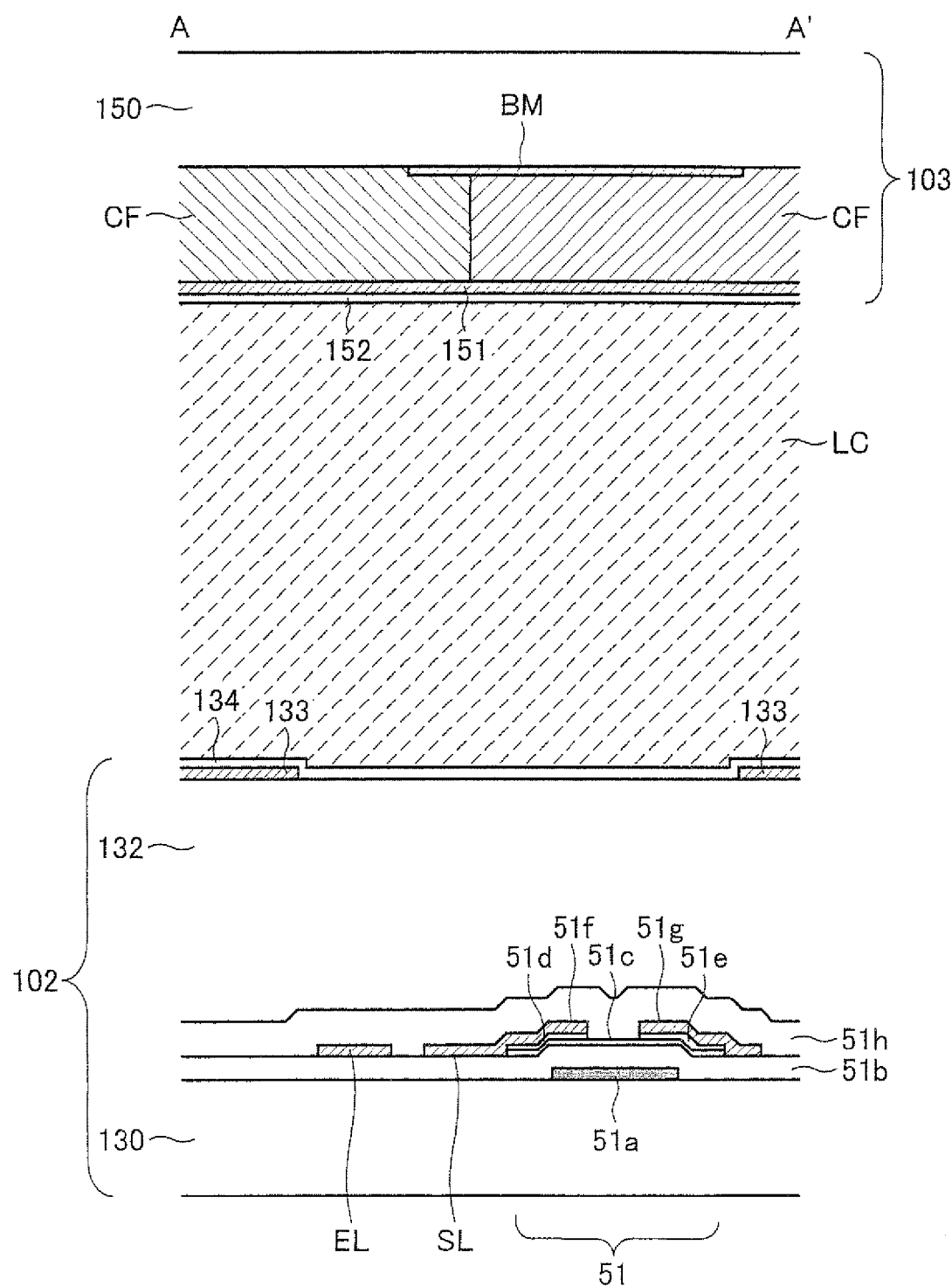
FIG. 11 is a cross-sectional view of the pixel of FIG. 10 which cross-sectional view was taken along the line A-A'.
Figure 12:
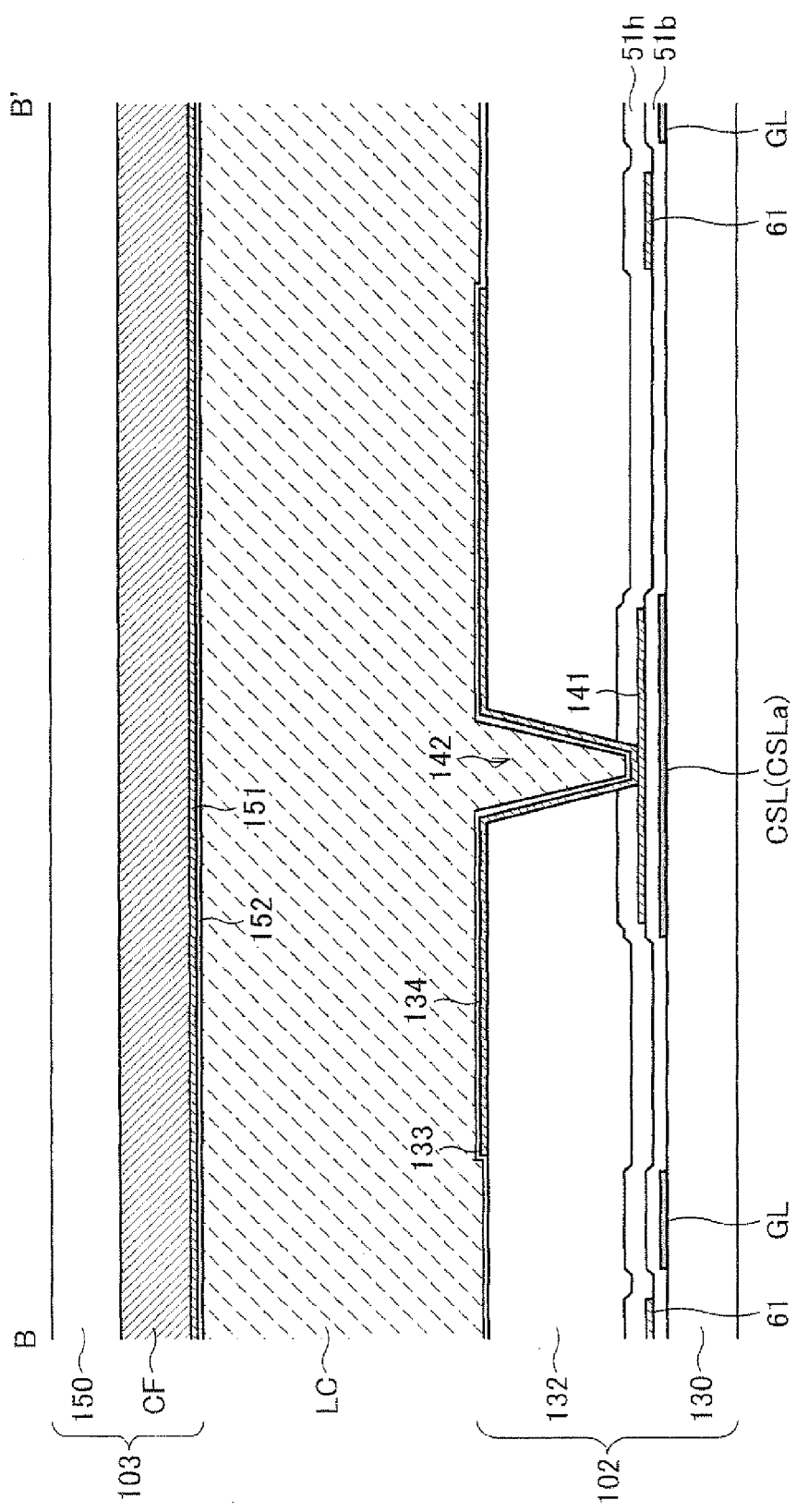
FIG. 12 is a cross-sectional view of the pixel of FIG. 10 which cross-sectional view was taken along the line B-B'.

The following describes yet another embodiment of the present invention, with reference to FIGS. 10 through 12. The following assumes that, among members having the same reference letters and numerals as those of the members described in the first embodiment, members which are not described below have the same functions as those described in the first embodiment.

In the present embodiment, a pixel electrode 133 is provided so as not to face a gate line GL, a source line SL, a spare line EL or FL, and a connection line 61 or 92, unlike the embodiments 1 through 4.

FIG. 10 illustrates a modification of an arrangement of a pixel PIX, illustrated in FIG. 2, which corresponds to the first through third embodiments.

According to the pixel PIX illustrated in FIG. 10, a connection line 61 is provided so as to be adjacent to a gate line GL of an adjacent line of pixels, and then a pixel electrode 133 is provided so as not to face, in a film thickness direction, a gate line GL, a source line SL, a spare line EL, a connection line 61, and a TFT 51. The arrangement is also illustrated in FIG. 11, which is a cross-sectional view taken along the line A-A' in FIG. 10, and in FIG. 12, which is a cross-sectional view taken along the line B-B' in FIG. 10.

A pixel PIX thus arranged leads to the following results (1) through (5).

A parasitic capacitance CsD between (i) a pixel electrode 133 and (ii) a source line SL, a spare line EL, and a connection line 61 is small. This is because a pixel electrode 133 does not face a source line SL, a spare line EL, and a connection line 61 at all. The display panel has a large area of wires for supplying data signals because the display panel includes the spare lines EL and the connection lines 61. Nonetheless, it is possible to suppress the parasitic capacitance Csd to a small capacitance. Accordingly, a potential of the pixel electrode 133 is less affected by respective potentials of a source line SL, a spare line EL, and a connection line 61 while a TFT 51 is being OFF. As a result, a potential held by the pixel electrode 133 is stabilized. In addition, it is possible to (i) reduce or ultimately eliminate an interlayer insulating film 132 and (ii) to use a film having a large dielectric constant as the interlayer insulating film 132, since the parasitic capacitance Csd is small.

In a conventional display panel having spare lines as illustrated in FIG. 8, a spare line is provided so as to pass over an aperture of a pixel. As such, an area in which a spare line and a pixel electrode face each other is large. This causes a problem of increase in parasitic capacitance Csd between (i) a pixel electrode and (ii) a source line, a spare line, and a connection line. A parasitic capacitance Csd becomes large particularly (i) in a case where interlayer insulating films are thin that are provided between (a) a pixel electrode and (b) respective of a source line, a spare line and a connection line, or (ii) in a case where the interlayer insulating films have a large dielectric constant. This causes light leakage of a whole pixel due to failure of control of alignment of liquid crystal molecules, and/or causes a voltage delay of a data signal.

With regard to such problems, each of the display panels of the first through third embodiments also makes it possible to suppress a parasitic capacitance Csd to be smaller than that of a conventional display panel. This is because in each of the display panels it is possible to freely adjust an area in which an end part of the pixel electrode 133 faces a spare line EL.

A pixel electrode 133 does not face a source line SL, a spare line EL, and a connection line 61 at all. As such, in spite of the fact that the interlayer insulating film 132 is thin, it is difficult for a problem to arise that leakage occurs between a pixel electrode 133 and any one of the lines: a source line SL; a spare line EL; and a connection line 61 due to the reason that a metal foreign object is laid on the line. As a result, it is possible to prevent a source side and a drain side of a TFT 51 from short-circuiting. In a case where such a short-circuiting occurs, it is necessary that an area, where the short-circuiting occurs, is fused by laser fusion as described in the third embodiment. Note that it is not possible, in some area where a short-circuiting occurs, to remedy such a short-circuit.

A pixel electrode 133 does not face a gate line GL at all. As such, it is difficult for a problem to arise that leakage occurs between a pixel electrode 133 and a gate line GL due to the reason that a metal foreign object is laid on the gate line GL. As a result, it is possible to prevent a gate side and a drain side of a TFT 51 from short-circuiting.

A pixel electrode 133 does not face a TFT 51 at all. It is difficult for a problem of leakage between a pixel electrode 133 and a TFT 51 due to the reason that a metal foreign object is laid on the TFT 51. As a result, it is possible to prevent abnormal operation of the TFT 51.

Furthermore, a connection line 61 is provided so as to be adjacent to a gate line GL of an adjacent line of pixels. This allows a pixel electrode 133 to maximally occupy above an aperture region of a pixel PIX without facing a connection line 61. As a result, an aperture ratio of a pixel PIX is not decreased.

The fourth embodiment can yield the results (2) through (5) in a case where the spare line EL and the connection line 61 are replaced with a spare line FL and a connection line 92, respectively.

The descriptions describe, thus far, the embodiments of the present invention. It is possible to manufacture, with a high yield, a display apparatus having a display panel without illumination failure of a pixel, by arranging a display apparatus including a display panel of any one of the embodiments in accordance with the present invention.

Note that the display panel and the display apparatus can adopt, as a display element, an organic EL element, dielectric liquid, an electrochromic or the like, other than the liquid crystal.

The present invention is not limited to the embodiments, and may be modified within the scope of the claims. An embodiment based on a proper combination of technical means disclosed in different embodiments is also encompassed in the technical scope of the present invention.

As described, the display panel of the present invention is an active matrix display panel, including spare lines provided for respective data signal lines, the spare lines each connected with a corresponding one of the data signal lines via a plurality of connection lines, each of the spare lines being away from a corresponding one of the data signal lines, in a direction in which scanning signal lines extend, so that a whole aperture region of a pixel connected with the corresponding one of the data signal lines is sandwiched between the each of the spare lines and the corresponding one of the data signal lines.

In an arrangement in which a spare line is provided for each of data signal lines, the arrangement makes it possible to realize a display panel in which a data signal line and a corresponding spare line are unlikely to have a breaking that eliminates continuity to their ends.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is suitably applicable particularly to a liquid crystal display apparatus, with high definition and a large screen, in which a probability of a breaking is high.

The invention claimed is:

1. An active matrix display panel comprising:
spare lines provided for respective data signal lines, the spare lines each connected with a corresponding one of the data signal lines via a plurality of connection lines,
each of the spare lines being away from a corresponding one of the data signal lines, in a direction in which scanning signal lines extend, so that a whole aperture region of a pixel connected with the corresponding one of the data signal lines is sandwiched between the each of the spare lines and the corresponding one of the data signal lines; and wherein:
storage capacitance lines for causing pixels to have respective storage capacitances are provided, for respective lines of the pixels, so as to (i) be away from a corresponding one of the plurality of scanning signal lines in a direction in which the data signal lines extend and (ii) extend in a direction intersecting with a direction in which the data signal lines and the plurality of spare lines extend;
there are first columns of pixels, among a plurality of columns of pixels, each having a pixel column line which is connected with the respective storage capacitance lines at intersections of the pixel column line and the storage capacitance lines, the pixel column line being at least one of a corresponding one of the data signal lines and a corresponding one of the plurality of spare lines;
in each of the first columns of pixels,
in a case where the storage capacitance lines connected with the pixel column line at the intersections are first storage capacitance lines,
a first storage capacitance line is connected with a spare line of a second column of pixels which is different from the first columns of pixels, at intersections between the first storage capacitance line and the spare line of the second column of pixels, so as to be connected across first storage capacitance lines via the spare line;
a first segment that includes all connecting points between the pixel column line and the spare line of the second column of pixels is separated from the first storage capacitance line;
a second segment is separated from the spare line of the second column of pixels so that the second segment is separated from a data signal line of the second column of pixels, the second segment including connecting points between the first storage capacitance lines and the spare line of the second column of pixels.

2. The display panel as set forth in claim 1, wherein a voltage is applied via both ends of each of the plurality of storage capacitance lines.

\* \* \* \* \*